United States Patent [19]

Nielsen

[11] 4,169,736

[45] Oct. 2, 1979

[54] ADDITIVE FOR GROUTS, ITS PREPARATION AND USE

[76] Inventor: Hilmer R. Nielsen, Krögarvägen 16, Norsborg, Sweden, 145 52

[21] Appl. No.: 862,099

[22] Filed: Dec. 19, 1977

[30] Foreign Application Priority Data

Jan. 5, 1977 [SE] Sweden .................................. 7700110

[51] Int. Cl.² ............................................... C04B 7/353
[52] U.S. Cl. ........................................ 106/93; 106/95; 106/119; 106/315
[58] Field of Search .................... 106/90, 93, 314, 95, 106/119, 315

[56] References Cited

U.S. PATENT DOCUMENTS

| 7,206 | 5/1888 | Straub | 106/93 |
|---|---|---|---|
| 3,311,483 | 3/1967 | Garnier et al. | 106/93 |

*Primary Examiner*—Winston A. Douglas
*Assistant Examiner*—J. V. Howard
*Attorney, Agent, or Firm*—Burns, Doane, Swecker & Mathis

[57] ABSTRACT

Improving additive for cement and related masses based on an inorganic binder, comprising an alkali extract of lignocellulosic materials, the extract being modified with a fatty acid or an oily ester thereof; a process for the preparation of such additive; and a method of using the additive in improving the hardening characteristics of a cement or related mass.

16 Claims, No Drawings

ADDITIVE FOR GROUTS, ITS PREPARATION AND USE

The present invention relates to an improving additive for grouts based on inorganic binders, for example cement and lime, and the invention also covers a process for the preparation of such additive and a method of using it to improve the hardening characteristics of grouts.

In spite of the enormous importance of inorganic binders for the building industry, such as cement and lime, they are far from satisfactory from several aspects. Thus, they have as a rule too long curing time resulting in delay at the working sites and high mould costs by the day-long periods of time required for example for different cement products before de-moulding can take place. Moreover, cement and lime grouts or pastes are generally after hardening much too water-absorbing, which can result in bursting from freezing and this usually results in bad heat insulation. Furthermore, magnesia cement has the disadvantage that it is not resistant to ageing in view of dissolution of magnesium chloride. They also often show unsatisfactory binding characteristics in relation to other building materials, such as steel and wood, and to desirable lighter and more insulating ballast materials, such as straw, wood fibre, saw dust, turf and the like. The last-mentioned characteristic is particularly pronounced when dealing with so-called magnesia cement, which has encountered particular difficulties on the market. Straw obtained from ordinary crops the surface of which is protected by a wax layer, is especially repellent to binding to cement and especially to magnesia cement, which fact counteracts a more general use of this, in other respects desirable ballast and reinforcement material in different types of cement products.

In attempts to remove the protective wax layer on straw by means of an alkali in order to improve the adhesion to cement, particularly magnesia cement, it has been found that the alkali-treatment results not only in dissolution of the wax layer but also in dissolution of other substances from the straw so as to expose the fibres thereof. The fibre mass thus obtained, after squeezing out the alkali and after washing, is an excellent reinforcement material for cement and lime grouts.

However, it is not only the exposed straw fibre which is of interest. The alkali extract obtained has been found to constitute an improving agent for cement and lime grouts as well as products where such grouts are present as binders, the above indicated disadvantages being largely avoided and the area of use of the grouts being extended. This alkali extract improving agent is obtained not only by treatment of stalks of the different kinds of grain, but also of stalks from other similar straw plants, such as grass, reeds and the like. While this invention will be described primarily in connection with alkali-treatment of straw it must be noted that the invention covers the use of all kinds of lignocellulosic materials. With regard to straw one usually means the stalks remaining from mature threshed crop.

The present invention, which is further characterized in the appended patent claims, is therefore based on the extract of cellulosic materials obtained by treating such materials with alkali, suitably at room temperature. The material, such as straw, may be treated in the state as harvested, but it may be advantageous first to cut it into shorter pieces and possibly also subject the same to light mechanical crushing, for example between rolls in order to accelerate the digestion.

The digestion takes place with alkali having a concentration of at least 5%. (In this disclosure, if not otherwise indicated, all percentages are based upon weight). Stronger alkali than 20% does not give any shortened digestion time. From a practical point of view it is therefore most convenient to use an alkali of about 20%, but the extract obtained should before use in accordance with the invention be diluted with 4 to 5 times its volume of water in order to facilitate the subsequent mixing operation. By using a 5% alkali a useful extract is obtained after about 24 hours at room temperature, whereas after about 36 hours also the fibres have been digested to a major extent. The corresponding periods of time when using 20% alkali is 6 and 18 hours, respectively. Heating when the treatment is carried out in an open vessel does not give any significant acceleration of the digestion. Contrary hereto the digestion is accelerated by crushing the stalks, for example between rollers, so that using 20% alkali, digestion to expose the fibres can be carried out in 2 hours. When using 20% alkali a suitable proportion has been found to be 15–20 kgs of straw per 100 liters of alkali. The extract obtained when using concentrated alkali has the consistency of a relatively thick fluid oil, the viscosity of which increases to a gel-like consistency if a longer period of digestion is used. This is one of the reasons that it should be diluted before the subsequent use.

The alkali extract prepared as described above cannot as such be mixed with cement or lime grouts, since it immediately results in a reaction making the grout clotty to gravel-like. This reaction tendency must therefore be modified, which can be done simply by a kind of neutralization of the alkalinity of the extract. This neutralization or perhaps rather saponification is in accordance with the invention performed by means of fatty acids being in a liquid state at or slightly above room temperature, such as up to about 35° C. However, the fatty acids need not be used as such since it has been found to work equally well with their oily esters, for example in the form of vegetabilic oils. Thus, excellent results have been obtained with rape oil, peanut oil, corn oil, sweet oil, olive oil and mustard oil. Suitable proportions of oil admixed into the alkali extract are about 2.5 to 5 volume parts of oil per 100 volume parts of diluted extract.

Both soda and potash lyes are useful for the preparation of the alkali extract, but the potash lye has been found to be sufficiently more advantageous in that it makes the mortar more flexible and is less foaming, that potash lye is preferred spite of the high cost thereof.

When preparing a paste or mass which is improved by using the extract according to the invention 3–10 percent by volume of extract are admixed into the water used, lower contents giving a reduced hardness and high contents giving an increased hardness with regard to the final product.

In this disclosure the expression "grout" or "paste" is intended to cover all kinds of masses setting to form a solid structure. The usual binders in such mass are cement and lime, and when sand and gravel or crushed stone are intermixed with for example a cement paste they are held together in a dense structure which is called concrete. When sand alone is admixed with Portland cement the grout is a so-called mortar. It is the paste which determines most of the important engineering and chemical properties of the final concrete.

Thus, in one aspect of the invention there is provided an improving additive for grouts or pastes, comprising an alkali extract of a lignocellulosic material, in which said extract has been modified with a fatty acid or an oily ester thereof. The acid or ester is suitably in a liquid state at or slightly above room temperature.

In another aspect of the invention there is provided a process for the preparation of an improving additive for grouts or pastes, comprising treating a lignocellulosic material with an alkaline solution;
recovering the the extract solution thereby obtained; and modifying the extract solution by treating same with a fatty acid or an oily ester thereof.

According to a third aspect of the invention there is provided a method of improving the hardening characteristics of building grouts or masses based on an inorganic binder, comprising adding to the mass an improving additive as defined above. The inorganic binder used is preferably cement and/or lime.

The improvement obtained by using the extract is primarily manifested by its effect on the hardening time or the so-called de-moulding time. Whereas the de-moulding time for ordinary Portland cement when used on the building sites normally is of the order of 7 days it can be shortened by admixing the modified extract according to the invention down to 2 days. With regard to magnesia cement the corresponding de-moulding time is shortened from about 2 days to about 4 hours. Adding the extract to ordinary lime paste results in a significant shortening of the drying time. By adding the extract to cement pastes they become more flexible, are easier to vibrate and give better filling of the moulds in for example prefabrication of different profiles. Moreover, the adhesion to ballast materials, is improved not only with regard to sand, gravel and shingle but also with regard to untreated straw, saw dust and wood fibre. The paste also adheres better to other building constructional materials, such as old concrete, steel, glass, brick and wood. The completely hardened final product is in all tested uses provided with a better, pore-less cement skin and an improved resistance to impact. Particularly with regard to magnesia cement the addition of the extract has been found completely to counteract the deterioration by dissolution of magnesium chloride, which would otherwise take place progressively. Repeated treatment of test bodies of magnesia cement in alternatingly hot and cold water for 7 days has not shown any dissolution of $MgCl_2$ in the water and has not in any way decreased the compressive strength.

A grout or paste of magnesia or Portland cement improved according to the invention may also advantageously be admixed with a synthetic binder consisting of equal parts by volume of polymeric acrylate and carboxy methyl cellulose (CMC). With regard to magnesia cement CMC is suitably dissolved in part of the magnesium chloride solution for use in the paste, whereafter the liquid acrylate is admixed and the mixture thus obtained admixed in the rest of the paste mixture. With regard to Portland cement CMC is digested in part of the water intended for the paste, the acrylate being then admixed and the mixture blended with the remaining constituents of the mortar. The amount of acrylate as well as the amount of non-aqueous CMC added is suitably about 5% of the water volume of the paste. In this way it is possible to considerably increase the ratio ballast material to cement in the paste, so that when using for example chips or fibres of wood, turf, straw and bark as a ballast it is possible by casting to manufacture wood-like products having a stabilizing cement skeleton, which products are excellently nailable and workable with cutting tools.

What is claimed is:

1. An additive for improving the hardening characteristics of inorganic hydraulic binder compositions, comprising an alkali extract of a lignocellulosic material modified with a fatty acid or a fatty acid oily ester which is in a liquid state at or slightly above room temperature.

2. The additive of claim 1, wherein said additive comprises a modified alkali extract of straw produced by treating said straw with a 5–20% by weight alkali solution and modifying the resulting extract with 3–5% of a vegetabilic oil, based on the volume of extract.

3. The additive of claim 1, wherein said additive comprises an alkali extract of straw modified with a fatty acid or a fatty acid oily ester liquid at or slightly above room temperature.

4. The additive of claim 1, wherein said inorganic hydraulic binder composition is selected from the group consisting of cement and lime compositions.

5. A process for the preparation of an additive for improving the hardening characteristics of inorganic hydraulic binder compositions, comprising the steps of:
 (a) treating a lignocellulosic material with an alkaline solution to produce an alkali extract of said material;
 (b) recovering said alkali extract; and
 (c) modifying said extract by treating said extract with a fatty acid or a fatty acid oily ester which is in a liquid state at or above room temperature.

6. The process of claim 5, wherein said lignocellulosic material is treated with soda or potash lye having a concentration of alkali within the range of about 5–20% by weight.

7. The process of claim 5, wherein said extract is modified with a vegetabilic oil.

8. The process of claim 7, wherein said extract is modified with about 3–5% of a vegetabilic oil, based on the volume of extract.

9. A method for improving the hardening characteristics of inorganic hydraulic binder compositions, optionally containing an organic binder, comprising adding to said composition the additive of claim 1.

10. The method of claim 9, wherein said additive comprises a modified alkali extract of straw produced by treating said straw with a 5–20% by weight alkali solution and modifying the resulting extract with 3–5% of a vegetabilic oil, based on the volume of extract.

11. The method of claim 9 wherein said inorganic hydraulic binder composition is selected from the group consisting of cement and lime compositions.

12. The method of claim 9, wherein said additive is added to said inorganic hydraulic binder composition in an amount of about 3–10% by volume of the water used in preparing said composition.

13. A rapid curing inorganic hydraulic binder composition, comprising:
 a. an inorganic hydraulic binder;
 b. water; and
 c. the additive of claim 1.

14. The composition of claim 13, wherein said additive comprises about 3–10% by volume of the water used in said composition.

15. The composition of claim 13, wherein said composition further comprises an organic binder.

16. The composition of claim 13, wherein said inorganic hydraulic binder is selected from the group consisting of cement and lime.

* * * * *